United States Patent Office 2,985,690
Patented May 23, 1961

2,985,690

COMPOUNDS PRODUCED BY RADICAL ADDITION REACTIONS OF HALOGENATED OLEFINS AND COMPOUNDS PRODUCED THEREBY

William T. Miller, Ithaca, N.Y., assignor, by mesne assignments, to Minnesota Mining and Manufacturing Company, St. Paul, Minn., a corporation of Delaware No Drawing. Original application July 12, 1955, Ser. No. 521,638, now Patent No. 2,880,247, dated Mar. 31, 1959. Divided and this application Nov. 24, 1958, Ser. No. 778,555

5 Claims. (Cl. 260—653.3)

This invention relates to novel radical addition reactions of poly- and perhalogenated alkanes with halogenated ethylenically unsaturated compounds. This application is a division of my prior and copending application S.N. 521,638, filed July 12, 1955, now Patent No. 2,880,247.

The principal reactions occurring in the process of the present invention are as follows, in which $CX_4$ is a perhalogenate alkane, i.e., a perhalogenated methane:

Free radical addition of $CX_4$ to an Olefin 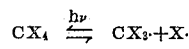

[Principal reactions]

*Initiation*

Photochemical (1) $CX_4 \underset{}{\overset{h\nu}{\rightleftarrows}} CX_3\cdot + X\cdot$ or thermal (in the case of iodides) $CX_4 \overset{\Delta}{\rightleftarrows} CX_3\cdot + X\cdot CX_4 + R\cdot$ (from peroxide) $\longrightarrow RX + CX_3\cdot$ (2) 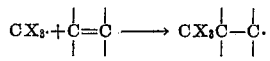

*Polymerization*

(3) 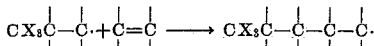

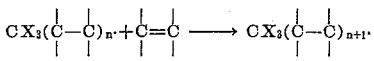

*Chain transfer*

(4) 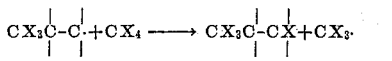

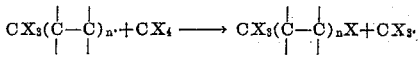

*Termination*

(5) 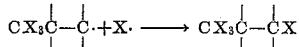

(6) 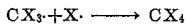

The initial free radicals are produced by the photochemical or thermal dissociation of the halogenated methane or may be produced in any other conventional manner such as by the use of a peroxide catalyst, exemplary of such catalysts being acyl peroxides such as acetyl, benzoyl, and pelargonyl peroxides or other sources of free radicals such as the compound

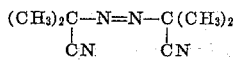

If the radicals formed by the dissociation of the methane do not attack the olefin, the observed reaction products are decomposition products derived from the methane. An example of this behavior is shown when an attempt is made to add trichloroiodomethane to hexafluorocyclobutene. The hexafluorocyclobutene is unchanged, and hexachloroethane and iodine are formed.

The initiation step is followed by a propagation step which can involve a number of olefin molecules for every initiation. An initiating radical can react with an olefin molecule to form a new larger radical, a process leading to polymerization, or stabilize itself by abstracting an atom from a nearby molecule, a chain transfer reaction, with the formation of a new radical which can continue the chain process and lead to a saturated product. If the polymerization predominates, relatively high molecular weight products are formed. When chain transfer is more important, the product is primarily the monomer addition product, and if both of these steps are slow, the intermediate radicals have a relatively long life and coupled or disproportionation products are formed in significant quantities.

The reactivity of chlorofluoro free radicals is

This is also the order which would be predicted on the basis of steric effect.

An attacking radical, Equation 2 above, might attack either or both ends of an unsymmetrical olefin with the formation of either or both of the possible addition products. It has been shown, however, that a clean-cut orientation effect is operative in free radical reactions involving hydrogen-containing olefins with only one of the two possible isomers being formed. Furthermore, in every case, the initial attack was on the most exposed position to yield the intermediate radical which was predicted to be the most stable.

In the present invention the following illustrative product was obtained from the unsymmetrical perhaloolefin:

| Reactants | Product |
|---|---|
| $CCl_3I + CF_2=CClF$ | $CCl_3CF_2CClFI$ |

This product indicates that the initial attack by $CX_3\cdot$ radicals is on the exposed $CF_2$— carbon as the $CCl_2F\cdot$ radical adds to the $CH_2$— carbon of unsymmetrical difluoroethylene. This orientation is the one which would be predicted from steric considerations.

The alkanes which may be added to halogenated olefins in accordance with the present invention are those having the formula

in which X may be fluorine, chlorine, or a poly- or perhalogenated alkyl radical having not in excess of about 8 carbon atoms and in which all of the halogen atoms are fluorine or chlorine, and $X_1$ and $X_2$ may be fluorine or chlorine, at least one of $X_1$ and $X_2$ being chlorine. When X is a polyhalogenated radical, the average hydrogen content is numerically no more than the carbon content. Exemplary of such compounds are $CCl_3I$, $CClF_2CClFI$, $CClF_2CCl_2I$, and $CCl_2FI$.

The olefins which may be used in the process of the invention are those having the formula

in which Y may be hydrogen, fluorine, chlorine, or a saturated or unsaturated perhalogenated alkyl radical having not in excess of 12 carbon atoms and in which all of the halogen atoms of the alkyl radical are fluorine or chlorine, $Y_1$ may be hydrogen, fluorine, or chlorine and $Y_2$ and $Y_3$ may be fluorine or chlorine. At least one of the Y substituents must be other than fluorine. Exemplary of the olefins contemplated are CClF=CF$_2$, CH$_2$=CF$_2$,

CF$_3$CF=CF$_2$

CF$_3$CH=CF$_2$, CF$_2$=CFCF=CF$_2$, CFCl$_2$CF$_2$CF=CF$_2$,

CF$_3$CF$_2$CF$_2$CF$_2$CF$_2$(CF$_2$)$_5$CF=CF$_2$

CFCl$_2$CF$_2$CF$_2$CH$_2$CF=CF$_2$

CF$_2$=CHCClFCF$_2$CF=CHF

CF$_2$ClCH$_2$CClFCF$_2$CF=CHF

CF$_2$ClCH$_2$CClFCF$_2$CF$_2$CH$_2$CF=CF$_2$ and CFCl$_2$CF$_2$(CFClCF$_2$)$_n$CF=CF$_2$, where $n$=1 to 10.

The most satisfactory olefins for radical addition reactions are the more reactive types, as evidenced by their polymerizability, provided effective chain transfer agents are utilized for addition. However, useful syntheses are also obtained with less reactive olefins which have not been satisfactorily polymerized alone and for which, although reaction occurs more slowly, the simultaneous formation of polymer is not a problem. On the other hand, useful addition reactions are not obtained with disubstituted olefins of the general type R$_x$CF=CFR$_x$ in which R$_x$ is a perhalogenated group.

The most effective radical chain transfer compounds are iodides of the type RCCl$_2$I in which R is chlorine, fluorine, or a perhalogenated group, and excellent yields of monomer addition compounds are obtained by reaction of these iodides with the more reactive olefins. Mild reaction conditions and equivalent quantities of reactants can be utilized with the avoidance of decomposition and the necessity for handling excess chain transfer agent.

The products of the addition reaction may be further treated to produce additional novel compositions of matter. For example, reduction and dehalogenation was observed with the addition product of 1,2-dichloro-1,1,2-trifluoroiodoethane and chlorotrifluoroethylene as follows:

$$CClF_2CClFCF_2CClFI \xrightarrow[ethanol]{Zn} CF_2=CFCF_2CHClF$$

The replacement of iodine by hydrogen as a result of treatment with zinc and alcohol represents a useful new synthetic method.

Dehydrohalogenation may be employed to prepare halogenated alkanes from iodoalkanes as follows, in which 3,3-dichloro-1,1,3-trifluoropropene is prepared from 1,1-dichloro-1,3,3-trifluoro-3-iodopropane, and the structure of the propene is confirmed by oxidation:

CCl$_2$FCH$_2$CF$_2$I → CCl$_2$FCH=CF$_2$

CCl$_2$FCH=CF$_2$ → CCl$_2$FCOOH

The radical addition reactions of the invention may be effected using a molar ratio of poly- or perhalogenated alkane to halogenated monoolefin in the range of 1 to 1, to 20 to 1, a temperature in the range of 0 to 250° C., preferably 20 to 200° C., and a reaction time of 30 seconds to 150 hours, preferably 0.5 to 2.5 hours. When a peroxide catalyst is used, it may be employed in a concentration of 0.1 to 10 moles per 100 moles of olefin. The pressure may be in the range of 1 to 100 atmospheres, and is preferably autogenous. When di- and triolefins, and the like, are used, the molar ratio of reactants is increased in favor of the alkane.

Also, in the present invention it was found that perhalogenated iodides, such as the compound CClF$_2$CCl$_2$CF$_2$CClFI can be coupled to form compounds such as (CClF$_2$CCl$_2$CF$_2$CClF)$_2$ This perhalogenated octane is the hexachloride of the unconjugated triene, CF$_2$=CClCF$_2$CF=CFCF$_2$CCl=CF$_2$ a desired monomer material.

The products produced by the process of the invention are useful as solvents for fluorine-containing polymers, fire extinguishing agents, non-flammable hydraulic fluids, lubricating oil additives, and chemical intermediates in the preparation of other compounds.

The invention will be further illustrated by reference to the following specific examples:

EXAMPLE 1

Reaction of C$_3$ClF$_6$I with zinc

Ten grams of C$_3$ClF$_6$I were added slowly to a suspension of 15 grams of zinc dust in 30 ml. of refluxing commercial absolute ethanol. An exothermic reaction occurred, but no material boiling below 0° C. was collected. The product was distilled out of the reaction mixture, treated with P$_2$O$_5$ to remove the alcohol, and distilled. The product, 4 grams, boiled at 18° C. at 735 mm. The infrared spectrum of this material showed a carbon-hydrogen peak. The isomeric CHF$_2$CF$_2$CClF$_2$ is reported to boil at 21° C.

This hydrogen-containing compound, presumed to be CF$_3$CF$_2$CHClF, was sealed up with chlorine and water and irradiated in a 5-bulb ultraviolet illuminator for 18 hours. The resulting compound was washed with NaOH and water, then dried and distilled. The CF$_3$CF$_2$CCl$_2$F 3 grams, boiled at 35–36° C. at 740 mm. The refractive index was $n_D^{20}$ 1.312.

The structure was proven by the infrared spectrum, which was different from the spectra of the known CClF$_2$CF$_2$CClF$_2$ (B.P. 36.1° C.; $n_D^{20}$ 1.3027) and CClF$_2$CClFCF$_3$ (B.P. 34.8° C.; $n_D^{20}$ 1.3034).

EXAMPLE 2

Free radical addition reaction of CCl$_3$I and CClF=CF$_2$

A mixture of 66 grams of CClF=CF$_2$ and 126 grams of CCl$_3$I was placed in a Pyrex ampoule and illuminated for five days by 5 ultraviolet bulbs. The ampoule was opened and 8 parts of recovered unreacted CClF=CF$_2$ were allowed to distill out. The remaining liquid was distilled at 10 mm. to yield:

(1) Solid carbon dioxide trap _____ 18 grams
(2) B.P. 72 to 74° C./10 mm. _____ 46 grams ⎫
(3) B.P. 74 to 74.5° C./10 mm. _____ 56 grams ⎬ CCl$_3$CF$_2$CClFI, 77 percent.
(4) B.P. 74.5 to 75° C./10 mm. _____ 40 grams ⎭
(5) Residue.

Fraction 3 was redistilled into the following fractions:

Grams
(6) B.P. 74 to 74.2° C./10 mm. _____ 12
(7) B.P. 74.2° C./10 mm. _____ 28
(8) Residue _____ 16

The properties of Fraction 7 were: B.P., 74.2° C./10 mm.; $d_4^{20}$, 2.2265; $n_D^{20}$, 1.5080; F.P. −50.1° C. MR$_D$ found, 48.42; calculated, 48.48.

EXAMPLE 3

Fluorination of CCl$_3$CF$_2$CClFI

A sample of the addition product of CCl$_3$I and CClF=CF$_2$, prepared in the manner of Example 2 above (250 grams), was placed in a steel bomb with 180 grams of SbF$_3$ and 72 grams of Cl$_2$. The bomb was placed in a rocker-shaker and heated to 185±5° C. for twenty hours. The contents of the bomb, containing considerable free iodine, were steam distilled out of the bomb, steam distilled again to separate from the antimony salts and the bulk of the water, separated, dried over P₂O₅, and distilled to yield:

(1) B.P. 33 to 31.5° C ---------------- 25 grams ⎫ C₃Cl₂F₆, 45
(2) B.P. 35.1 to 35.2° C./740 mm ---- 21 grams ⎬ percent.
(3) B.P. 35.2 to 36° C --------------- 22 grams ⎭
(4) B.P. 36 to 72° C ---------------- 3 grams
(5) B.P. 72 to 73.7° C --------------- 20 grams ⎫ C₃Cl₃F₆, 32
(6) B.P. 73.7 to 73.8° C./737 mm ---- 21 grams ⎬ percent.
(7) B.P. 73.8 to 74° C -------------- 12 grams ⎭
(8) Residue ------------------------ 11 grams The properties of Fraction 2 were: B.P. 36.1° C./760 mm.; $n_D^{20}$, 1.3028; F.P. −125.3° C.

The reported properties of CClF₂CF₂CClF₂ are: B.P., 36.1° C./760 mm.; $n_D^{20}$, 1.3027; F.P. −124.9° C., −125.4° C.

The properties of Fraction 6 were: B.P. 74.8° C./760 mm.; $n_D^{20}$, 1.3510; F.P. −132.4° C.

The reported properties of CCl₂FCF₂CClF₂ are: B.P. 75.0° C./760 mm.; $n_D^{20}$, 1.3512; F.P. −132.4° C.

EXAMPLE 4

*Free radical addition reaction of CClF₂CClFI and CClF=CF₂*

The optimum reaction procedure found for the addition of CClF₂CClFI to CClF=F₂ consisted of heating a molar ratio of iodide to olefin of 4 to 1 with approximately 3 mole percent of the olefin of benzoyl peroxide at 100° C. for three to four hours. In a typical run, three 1500 ml. stainless steel aviation type oxygen cylinders were filled with a total of 2451 grams of CClF₂CClFI and 20 grams of benzoyl peroxide. The cylinders were cooled in solid carbon dioxide, evacuated, and a total of 259 grams of CF₂=CClF were condensed into them. They were heated in boiling water for the required time after which venting of the cylinders and distillation at reduced pressure (water pump) into a solid carbon dioxide trap yielded 67 grams of unreacted olefin, corresponding to a conversion of 74 percent. The light pink product was washed with aqueous sodium thiosulfate, dried over calcium chloride and distilled rapidly through a Berl saddle packed Hemple column to yield 2048 grams of unreacted CClF₂CClFI and a residue of 477 grams. Distillation of this residue yielded:

(1) B.P.38–40° C./60 mm -------- 65 grams (CClF₂CClFI).
(2) B.P. 60–68°–90° C./20 mm -- 190 grams (CClF₂CClFCF₂CClFI).
(3) B.P. 100–124° C./10 mm ---- 20 grams.
(4) Residue -------------------- 200 grams.

Fraction 3 was thought to be CClF₂CClF(CF₂CClF)₂I, but it was not further investigated. The residue was a very viscous mass at room temperature and was presumed to consist of higher polymers. Fraction 2 had the predicted B.P. for C₄Cl₃F₆I and chemical and analytical properties of this fraction later confirmed this structure. The direction of addition was predicted on the basis of earlier work and was later confirmed by its conversion to CF₂=CFCF₂CHClF and not to CF₂=CFCF=CF₂ by zinc in ethanol.

EXAMPLE 5

*Purification of the crude C₄Cl₃F₆I*

A preliminary distillation of the butane fraction of Example 4 above showed that although the majority of the fraction had a very narrow boiling range, it contained considerable impurities as indicated by change in refractive index. The impurity was suspected to be iodobenzene, derived from benzoyl peroxide, whose boiling point was within a few degrees of the butane.

Fraction 2 of Example 4 above (140 grams) was slowly dropped into a 3-necked flask, containing 25 ml. of 30 percent fuming H₂SO₄, equipped with reflux condenser, glass stirrer, and a dropping funnel. The mixture became warm (ca. 30–35° C.) but the temperature was easily controlled by the rate of addition (15 minutes). The mixture was stirred an additional 15 minutes at room temperature and finally 25 ml. of 95 percent H₂SO₄ were added and the whole mixture was drowned in water. The light pink organic layer was washed once with water to give a crude yield of 162 grams. The 28 gram loss in weight compares to the theoretical amount of iodobenzene of 31 grams if all the peroxide had been converted into this product.

The product was dried over magnesium sulfate and distilled to yield:

(1) B.P. 40–70.5° C./18 mm ---- 47 grams
(2) B.P. 70.5–70.5° C./18 ----- 29 grams, $n_D^{20}$ 1.4428.
(3) B.P. 70.5–70.5° C./18 ----- 15 grams, $n_D^{20}$ 1.4428.
(4) Residue ------------------ 56 grams, $n_D^{20}$ 1.4430.
(5) Solid carbon dioxide trap.

Fractions 1–4 (147 grams) corresponded to a yield of 22 percent based on unrecovered CF₂=CClF.

Physical properties of Fraction 2 were: B.P., 70.5° C./18 mm.; $n_D^{20}$, 1.4428; $d_4^{20}$, 2.1665. Calculated for C₄Cl₃F₆I: MR_D, 48.21; M.W., 395, AgCl+AgI, g./sample, g. 1.694. Found: MR_D, 48.70; M.W., 388, AgCl+AgI, g./sample, g., 1.697.

EXAMPLE 6

*Reduction and dehalogenation of CClF₂CClFCF₂CClFI*

A three-necked 600 ml. flask containing 72 grams of 90 percent zinc dust suspended in 100 ml. of ethyl alcohol was fitted to a distillation column, a mercury sealed wire stirrer and a dropping funnel. A solid carbon dioxide trap was connected to the column and the system was blanketed with nitrogen. The butane, 180 grams, was added slowly to the refluxing ethanol whereupon a vigorous reaction started. The product was removed through the column at a boiling point of approximately 50° C. as it formed. The mixture was refluxed for 1 hour after the bulk of the olefin had been removed and then material was removed until the boiling point of ethanol was reached, giving at best only a very small amount of additional olefin. Drowning of the pot residue yielded 17 grams of water insoluble liquid which contained chlorine and fluorine and was unsaturated to 2 percent KMnO₄. About 5 grams of low boiling material with an infrared spectrum somewhat similar to perfluorobutadiene were caught in the solid carbon dioxide trap.

The crude butene was washed with ice water to remove alcohol, dried over P₂O₅ and distilled to yield:

(1) B.P. 47.2–51.5° C./736 mm.. 9 grams, $n_D^{23}$ 1.3220.
(2) 51.5–51.5° C./736 --------- 4 grams, 1.3222.
(3) B.P. 51.5–52.0° C./736 ----- 25 grams, 1.3228.
(4) B.P. 53–54° C./736 -------- 6 grams, 1.3288.
(5) Residue ------------------ 12 grams.

Fractions 1–4 corresponded to a yield of 50 percent.

Physical properties of Fraction 3 were: B.P. 52.6° C./760 mm.; $n_D^{20}$, 1.3225; d (gravitometer at 20° C.), 1.531. Calculated for C₄ClF₆H: MR_D 25.90; M.W., 198; Cl, 17.7 percent. Found: MR_D, 25.84; M.W., 194; Cl, 17.8 percent.

The structure of the above product was accordingly concluded to be CF₂=CFCF₂CHClF, corresponding to CClF₂CClFCF₂CClFI for the addition product.

EXAMPLE 7

*Free radical addition reaction of CClF₂CCl₂I and CF₂=CClF*

It was reasoned that CClF₂CCl₂I should be a better chain transfer agent than CClF₂CClFI. This proved to be the case.

The most successful reaction was carried out by placing 288 grams of CClF₂CCl₂I along with 5 grams of benzoyl peroxide into a 450 ml. steel lecture cylinder. This was cooled in solid carbon dioxide, evacuated, and 89 grams of CF₂CClF were condensed into the bomb. The contents were shaken thoroughly, after sealing and warming to room temperature, and placed in a boiling water bath for 6 hours. Venting of the cylinder gave 33 grams of unreacted olefin and 348 grams of a light pink liquid which was distilled to yield:

(1) B.P. 59–62° C./40 mm___ 162 grams $CClF_2CCl_2I$.
(2) B.P. 55–70–73° C./5 mm___ 140 grams.
(3) Residue _____ 18 grams.
(4) Solid carbon dioxide trap _ 14 grams $CF_2=CClF$.

The boiling point of Fraction 2 was that predicted for $C_4Cl_4F_5I$. The yield based on Fraction 2 was 95 percent. A center cut of Fraction 2 gave the following physical properties: B.P. 55.0–55.3° C./1.5 mm.; $n_D^{20}$, 1.4800; $d_4^{20}$, 2.2024. Calculated for $C_4Cl_4F_5I$: $MR_D$, 53.16, AgCl+AgI, g./sample, g., 1.986. Found: $MR_D$, 53.11; AgCl+AgI, g./sample, g., 2.000.

Three other runs were carried out under the same conditions except that the ratio of iodide to olefin was changed slightly. The yields of butanes are summarized:

Moles iodide/olefin:    Percent yield of butane
1.0 _____ 79
1.0 _____ 59
1.0 _____ 59

The lower yields in each case were accompanied by the formation of relatively larger amounts of higher polymers.

EXAMPLE 8

*Free radical addition reaction of $CCl_2FI$ and Difluoroethylene*

The structure of the addition product was demonstrated as follows:

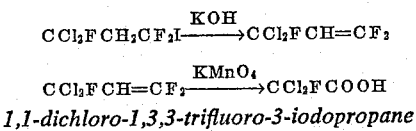

*1,1-dichloro-1,3,3-trifluoro-3-iodopropane*

Dichlorofluoroiodomethane, 129 grams, washed free of iodine with aqueous thiosulfate and dried over $CaCl_2$, and 2,8 grams of benzoyl peroxide were placed in a steel lecture cylinder fitted with a steel valve. The lecture cylinder was cooled in solid carbon dioxide and 36 grams of vinylidene fluoride were condensed into the cylinder from a tank using a pressure of approximately 20 p.s.i. The cylinder was shaken by hand and then placed in a furnace and heated at 85±3° C. for 15 hours. After heating, unreacted vinylidene fluoride was condensed into a steel lecture cylinder and the residual material was washed free of iodine with aqueous sodium thiosulfate. The crude product was dried over $CaCl_2$ and distilled to yield:

(1) Material trapped in solid carbon
  dioxide _____ 15.8 grams.
(2) B.P. 30–35–37° C./100 mm___ 44.5 grams unreacted $CCl_2FI$.
(3) B.P. 40–44–45° C./15 mm____ 68.2 grams.
(4) Residue (solidified on cooling)__ 8.0 grams.

Conversion, based on $CCl_2FI$, 54 percent; yield 78 percent.

Several fractions prepared in the same way as Fraction 3 were combined and redistilled to yield:

(5) B.P. 41–41.5° C./15 mm_ 19.2 grams.
(6) B.P. 41.5° C/14 mm___ 54.0 grams, $n_D^{20}$, 1.4659.
(7) B.P. 41.5° C./14 mm____ 100.5 grams, $n_D^{20}$, 1.4659.
(8) Residue _____ 5.0 grams.

Properties of Fraction 7, $CCl_2FCH_2CF_2I$, were: B.P., 41.5° C. at 14 mm. of Hg (estimated 148° C. (760 mm.), F.P., −62.9, −62.9, −63.0° C.; range <0.3° C., $n_D^{20}$, 1.4658; $d_4^{20}$, 2.0956; $MR_D$ calculated: 38.9. Found: 38.7. Halogen calculated: 67.55 percent. Found, on the basis of total silver halide precipitate: 67.3 percent. This compound turned dark red on standing in a refrigerator.

EXAMPLE 9

*3,3-dichloro-1,1,3-trifluoropropene-1*

Onto a five-fold excess of powdered KOH in a Claisen flask, heated by means of an oil bath to a temperature of 120±10° C., was dripped 117 grams of $CCl_2FCH_2CF_2I$. Vapors refluxing at 40–60° C. were collected. After all the halopropane had been added the system was pumped down to 2 mm., in order to recover unreacted starting material. The crude material was separated from water and dried over magnesium sulfate. Distillation of combined products from three typical runs based on a total of 362 grams of $CCl_2FCH_2CF_2I$ yielded:

Grams
(1) B.P. 45–51.5–52.0° C./734 _____ 97
(2) B.P. 52–85° C./100 mm. _____ 20
(3) Residue (impure $CCl_2FCH_2CF_2I$) _____ 54

Conversion, based on $CCl_2FCH_2CFI$, 85 percent. Yield, 56 percent.

Distillation of several fractions prepared in the same way as Fraction 1 yielded:

Grams
(4) Material in solid carbon dioxide trap _____ 2.5
(5) B.P. 47.0–51.5° C./741 mm. _____ 3.0
(6) B.P. 51.5–52.0° C./741 mm. _____ 32.0
(7) B.P. 52.0–52.2° C./741 mm. _____ 68.0
(8) B.P. #52.2° C./741 mm. _____ 8.5
(9) Residue _____ 15.5

Properties of Fraction 7, $CCl_2FCH=CF_2$, were: B.P., 52.0–52.2° C. at 741 mm. Hg, F.P., −102.0, −103.2° C., range 0.8° C.; $n_D^{20}$, 1.3702; $d_4^{20}$, 1.4504, $MR_D$, calculated: 25.6. Found: 25.7. Molecular weight calculated: 165.0. Found: 164 (Dumas bulb).

EXAMPLE 10

*Free radical addition reaction of $CCl_3I$ and hexafluorobutadiene*

Hexafluorobutadiene, 91 grams, was sealed in a Pyrex ampoule with 135 grams of $CCl_3I$ and placed in a 5-bulb illuminator for five days at room temperature. The contents of the ampoule were distilled at 10 mm. to yield:

(1) Solid Carbon Dioxide trap____ 11 grams, recovered $C_4F_6$.
(2) B.P. 60 to 62° C./10 mm_____ 101 grams  ⎫  $C_5Cl_3F_6I$, 93
(3) B.P. 62° C./10 mm_____ 22 grams   ⎬  percent.
(4) B.P. 62° C./10 mm_____ 86 grams   ⎭
(5) Residue_____ 5 grams.

The properties of Fraction 3 were: $d_4^{20}$, 2.0827; $n_D^{20}$, 1.4562; F.P. −24.3 to −24.7° C. $MR_D$ for $C_5Cl_3F_6I$: found, 52.69; calculated, 52.87. Fraction 3 decolorized $KMnO_4$ immediately and gave a precipitate with alcoholic $AgNO_3$ after five minutes but did not react with NaI in acetone at room temperature.

The structure of the $C_5Cl_3F_6I$ was indicated to be $CCl_3CF_2CF=CFCF_2I$ by its infrared spectrum which showed a —CF=CF— vibration at 5.80 microns but no —CF=$CF_2$ vibration in the region of 5.55 to 5.65 microns.

EXAMPLE 11

*Coupling by elimination of halogen with zinc dimerization of 1,2,2,4-tetrachloro-4-iodoperfluorobutane*

The compound $CClF_2CCl_2CF_2CClFI$, 170 grams was added in one portion to 30 grams of 90 percent zinc dust suspended in 225 ml. of methylene chloride mixed with 150 ml. of freshly distilled acetic anhydride contained in a 500 ml. three-necked flask provided with a mercury sealed Herschberg type wire stirrer and a water-cooled reflux condenser backed by a solid carbon dioxide trap. The entire apparatus was blanketed with nitrogen. The reaction started in about five minutes causing vigorous refluxing of the solvent but was easily controlled with an ice water bath. This bath was applied for about two and one-half hours after which the mixture was stirred for an additional eleven hours at room temperature (26° C.). The resulting liquid was decanted from the zinc-zinc halide mixture and the salt residue was washed with two 25 ml. portions of methylene chloride. The washings were combined with the main product and distilled to remove the solvents. A residue of 79 grams remained which was then washed with water to remove traces of zinc halide. The clean liquid product remaining had to be dried under vacuum due to its great viscosity. Distillation yielded:

|  | Grams |
|---|---|
| (1) B.P. 113° C./0.5 mm. | 70 |
| (2) Residue | 3 |
| (3) Solid carbon dioxide trap | 3 |

Fraction 1 corresponds to a yield of 60 percent of $C_8Cl_8F_{10}$. Physical properties of Fraction 1 were: B.P., 113° C./0.5 mm.; $n_D^{20}$, 1.4450; $d_4^{20}$, gravitometer at 20° C., 1.975. Calculated for $C_8Cl_8F_{10}$: $MR_D$, 76.60; Cl, 49.5 percent; M.W., 569. Found: $MR_D$, 78.9; Cl, 48.9 percent; M.W., 555.

EXAMPLE 12

The physical properties of the purest samples of novel compounds characterized are summarized below.

FORMAT (Molecular Formula—Compound Name—Structural Formula)

Source:

B.P. (boiling point at the prevailing atmospheric pressure)
B.P./760 (boiling point corrected to one atmosphere)
B.P. range
F.P.$t_1$ (equilibrium temperature of first appearance of crystals)
F.P. dep. (depression from $t_1$ to the point at which the material was estimated to be half frozen)
F.P. calc. (estimated from cooling curve)
$d_4^{20}$ g./ml.
$n_D^{20}$
$MR_D$ (molecular refractivity calculated using the Lorentz-Lorenz equation).

$C_3H_2Cl_2F_3I$  Propane, 1,1-dichloro-1,3,3-trifluoro-3-iodo-, $CCl_2FCH_2CF_2I$

| B.P. | 41.5° C./14 mm. |
|---|---|
| B.P./760 | 148.0° C. |
| F.P. $t_1$ | −63.0° C. |
| F.P. range | <0.3° C. |
| $d_4^{20}$ | 2.0956. |
| $n_D^{20}$ | 1.4658. |
| $MR_D$ | 38.7. |

$C_3HCl_2F_3$  Propene, 3,3 - dichloro - 1,1,3 - trifluoro-1-, $CCl_2FCH=CF_2$

| B.P. | 52.0–52.2° C./741 mm. |
|---|---|
| B.P./760 |  |
| F.P.$t_1$ | −102.0. |
| F.P. range | 0.8° C. |
| $d_4^{20}$ | 1.4504. |
| $n_D^{20}$ | 1.3702. |
| $MR_D$ | 25.7. |

$C_3Cl_4F_3I$  Propane, 1-iodo - 1,3,3,3,-tetrachlorotrifluoro- $CClFICF_2CCl_3$ Source: $CCl_3I+CClF=CF_2$

| B.P. | 72.2° C./10 mm. |
|---|---|
| F.P. $t_1$ | −50.1° C. |
| F.P. dep | <0.1° C. |
| $d_4^{20}$ g./ml. | 2.2265. |
| $n_D^{20}$ | 1.5080. |
| $MR_D$ | 48.4. |

$C_4HClF_6$  Butene, 4 - chloro - 1,1,2,3,3,4-hexafluoro-, $CF_2=CFCF_2CHClF$

Source: $CClF_2CClFCF_2CClFI+Zn/alcohol$

| B.P. | 51.5. |
|---|---|
| B.P./760 | 52.6. |
| B.P. range | 0.5° C. |
| $d_4^{20}$ (gravitometer at 20° C.) | 1.531. |
| $n_D^{20}$ | 1.3225. |
| $MR_D$ | 25.8. |

$C_4Cl_4F_5I$  Butane, 1,2,2,4 - tetrachloro - 4-iodopentafluoro-, $CClF_2CCl_2CF_2CClFI$ Source: $CClF_2CCl_2I+CClF=CF_2$

| B.P. | 55.0–55.3° C./1.5 mm. |
|---|---|
| F.P. | Glass. |
| $d_4^{20}$ | 2.2024. |
| $n_D^{20}$ | 1.4800. |
| $MR_D$ | 53.1. |

$C_4Cl_3F_6I$  Butane, 1,2,4 - trichloro-4-iodohexafluoro-, $CClF_2CClFCF_2CClFI$ Source: $CClF_2CClFI+CClF=CF_2$

| B.P. | 70.5° C./18 mm. |
|---|---|
| F.P. | Glass. |
| $d_4^{20}$ | 2.1665. |
| $n_D^{20}$ | 1.4428. |
| $MR_D$ | 48.7. |

$C_5Cl_3F_6I$  2 - pentene, 1-iodo, 5,5,5-trichloro, hexafluoro-, $CF_2ICF=CFCF_2CCl_3$ Source: $CCl_3I+CF_2=CF-CF_2$

| B.P. | 62° C./10 mm. |
|---|---|
| F.P. $t_1$ | −24.3° C. |
| F.P. dep. | 0.2° C. |
| F.P. calc. | −24.1° C. |
| $d_4^{20}$ g./ml. | 2.0827. |
| $n_D^{20}$ | 1.4562. |
| $MR_D$ | 52.7. |

$C_8Cl_8F_{10}$  1,2,2,4,5,7,7,8 - Octachloro-decafluorooctane $(CClF_2CCl_2CF_2CClF)_2$ Source: $CClF_2CCl_2CF_2CClFI+$zinc (acetic anhydride-methylene chloride)

| B.P. | 113° C./0.5 mm. |
|---|---|
| $d_4^{20}$ | 1.975 (gravitometer). |
| $n_D^{20}$ | 1.4450. |
| $MR_D$ | 78.92. |

It will be obvious to those skilled in the art that many modifications may be made within the scope of the present invention without departing from the spirit thereof, and the invention includes all such modifications.

I claim:
1. Compounds having the formula
$$CClF_2—R—CClFI$$
in which R is selected from the group consisting of $—CCl_2CF_2—$ and $—CClFCF_2—$ radicals.
2. A compound having the formula
$$CCl_2FCH_2CF_2I.$$
3. A compound having the formula
$$CF_2ICF=CFCF_2CCl_3.$$
4. A compound having the formula
$$CClFICF_2CCl_3.$$
5. A compound having the formula
$$(CClF_2CCl_2CF_2CClF)_2.$$

References Cited in the file of this patent

UNITED STATES PATENTS 2,614,131    Simons et al. _____ Oct. 14, 1952

OTHER REFERENCES

Henne et al.: Jour. Am. Chem. Soc., vol. 67, pages 1906–1908, only page 1907 needed.

Haszeldine, Jour. Chem. Soc. (London), pages 2495–2504, 1951, only page 2495 needed.

Haszeldine et al.: Jour. Chem. Soc. (London), pages 1952–1600, 1953, only pages 1592 and 1593 needed.

UNITED STATES PATENT OFFICE
CERTIFICATION OF CORRECTION

Patent No. 2,985,690                                                May 23, 1961

William T. Miller

It is hereby certified that error appears in the above numbered patent requiring correction and that the said Letters Patent should read as corrected below.

In the heading to the printed specification, lines 4 and 5, strike out "AND COMPOUNDS PRODUCED THEREBY"; column 1, line 43, lower right-hand portion of formula (3), for "n+1°" read -- $\bar{n}$+1 --; column 5, line 3, for "33 to 31.5° C." read -- 33 to 35.1° C. --; line 45, for "B. P. 60-68°-90°" read -- B. P. $\underline{60\text{-}68°}$-90° --; column 7, line 23, for "1.0" read -- 1.2 --; column 8, line 18, for "$CCl_2FCH_2CFI$" read -- $CCl_2FCH_2CF_2I$ --; column 10, line 29, for "$CCl_3I+CF_2=CF=CF_2$" read -- $CCl_3I+CF_2=CFCF=CF_2$ --.

Signed and sealed this 20th day of March 1962.

(SEAL)
Attest:

ERNEST W. SWIDER                                      DAVID L. LADD
Attesting Officer                                    Commissioner of Patents